United States Patent
Li (10) Patent No.: US 10,878,806 B1
(45) Date of Patent: Dec. 29, 2020

(54) SYSTEM AND COMPUTER-EXECUTABLE PROGRAM CODE FOR ACCELERATED RESCORING WITH RECURRENT NEURAL NET LANGUAGE MODELS ON HYBRID CPU/GPU MACHINES USING A FRAME-WISE, DELAYED DISPATCH OF RNNLM SCORE COMPUTATION TASKS TO THE GPU(S)

(71) Applicant: Haozheng Li, Pittsburgh, PA (US)

(72) Inventor: Haozheng Li, Pittsburgh, PA (US)

(73) Assignee: Medallia, Inc., San Francisco, CA (US)

( * ) Notice: Subject to any disclaimer, the term of this patent is extended or adjusted under 35 U.S.C. 154(b) by 118 days.

(21) Appl. No.: 16/237,014

(22) Filed: Dec. 31, 2018

(51) Int. Cl.
  *G10L 15/16* (2006.01)
  *G10L 15/22* (2006.01)
(52) U.S. Cl.
  CPC .............. *G10L 15/16* (2013.01); *G10L 15/22* (2013.01)
(58) Field of Classification Search
  CPC ................................. G10L 15/16; G10L 15/22
  USPC ........................................................ 704/232
  See application file for complete search history.

(56) References Cited

U.S. PATENT DOCUMENTS

| 10,573,312 | B1* | 2/2020 | Thomson | ................ | G10L 15/22 |
| 2017/0162203 | A1* | 6/2017 | Huang | .................. | G10L 15/285 |

OTHER PUBLICATIONS

Chen, Xie, et al. "CUED-RNNLM—an open-source toolkit for efficient training and evaluation of recurrent neural network language models." 2016 IEEE international conference on acoustics, speech and signal processing (ICASSP). IEEE, 2016.

Williams, Will, et al. "Scaling recurrent neural network language models." 2015 IEEE International Conference on Acoustics, Speech and Signal Processing (ICASSP). IEEE, 2015.

Li, Sicheng, et al. "FPGA acceleration of recurrent neural network based language model." 2015 IEEE 23rd Annual International Symposium on Field-Programmable Custom Computing Machines. IEEE, 2015.

Chen, Xie, et al. "Efficient training and evaluation of recurrent neural network language models for automatic speech recognition." IEEE/ACM Transactions on Audio, Speech, and Language Processing 24.11 (2016): 2146-2157.

Chen, Xie, et al. "Improving the training and evaluation efficiency of recurrent neural network language models." 2015 IEEE International Conference on Acoustics, Speech and Signal Processing (ICASSP). IEEE, 2015.

Chen, Xie Jeff. "CUED RNNLM Toolkit v1. 0." (2017).

Lee, Kyungmin, et al. "Accelerating recurrent neural network language model based online speech recognition system." 2018 IEEE International Conference on Acoustics, Speech and Signal Processing (ICASSP). IEEE, 2018.

Sutskever, Ilya, Oriol Vinyals, and Quoc V. Le. "Sequence to sequence learning with neural networks." Advances in neural information processing systems. 2014.

Shi, Yongzhe, et al. "Variance regularization of RNNLM for speech recognition." 2014 IEEE International Conference on Acoustics, Speech and Signal Processing (ICASSP). IEEE, 2014.

(Continued)

*Primary Examiner* — Quynh H Nguyen (74) *Attorney, Agent, or Firm* — David Garrod, Esq.

(57) ABSTRACT

A system and computer-executable program code for accelerated rescoring with recurrent neural net language models (RNNLMs) on hybrid CPU/GPU computer systems utilizes delayed, frame-wise (or layer-wise) batch dispatch of RNNLM scoring tasks to the GPU(s), while performing substantially all other tasks on the CPU(s).

20 Claims, 12 Drawing Sheets

| WFST |
|---|
| int32 num_state; |
| int32 org_num_state; /*origin num_state before inserting oov*/ |
| int64 num_arc; |
| FST_Node *head; |
| int32 *arc_end_node; |
| int32 *arc_i_label; |
| int32 *arc_o_label; |
| float *arc_weight; |
| int32 *arc_trans_id; |

(56) References Cited

OTHER PUBLICATIONS

Liu, Xunying, et al. "Two efficient lattice rescoring methods using recurrent neural network language models." IEEE/ACM Transactions on Audio, Speech, and Language Processing 24.8 (2016): 1438-1449.

Enarvi, Seppo, and Mikko Kurimo. "Theanolm-an extensible toolkit for neural network language modeling." arXiv preprint arXiv:1605.00942 (2016).

Gupta, Vishwa, and Gilles Boulianne. "Comparing computation in Gaussian mixture and neural network based large-vocabulary speech recognition." Interspeech. 2013.

Schrank, Tobias, et al. "Deep beamforming and data augmentation for robust speech recognition: Results of the 4th CHiME challenge." Proc. CHiME (2016): 18-20.

Popović, Branislav, Edvin Pakoci, and Darko Pekar. "A comparison of language model training techniques in a continuous speech recognition system for Serbian." International Conference on Speech and Computer. Springer, Cham, 2018.

Sundermeyer, Martin, Ralf Schluter, and Hermann Ney. "rwthlm—the RWTH Aachen University neural network language modeling toolkit" Fifteenth annual conference of the international speech communication association. 2014.

Watanabe, Shinji, et al. New Era for Robust Speech Recognition. Berlin, Germany: Springer-Verlag, 2017.

Stahlberg, Felix, et al. "SGNMT—A Flexible NMT Decoding Platform for Quick Prototyping of New Models and Search Strategies." arXiv preprint arXiv:1707.06885 (2017).

Kumar, Shankar, et al. "Lattice rescoring strategies for long short term memory language models in speech recognition." 2017 IEEE Automatic Speech Recognition and Understanding Workshop (ASRU). IEEE, 2017.

Xu, Hainan, et al. "Neural network language modeling with letter-based features and importance sampling." 2018 IEEE International conference on acoustics, speech and signal processing (ICASSP). IEEE, 2018.

Lee, Kyungmin, et al. "Applying gpgpu to recurrent neural network language model based fast network search in the real-time lvcsr" arXiv preprint arXiv:2007.11794 (2020).

Smit, Peter, et al. "Character-based units for unlimited vocabulary continuous speech recognition." 2017 IEEE Automatic Speech Recognition and Understanding Workshop (ASRU). IEEE, 2017.

* cited by examiner

| rnnBT |
|---|
| float ac_weight; |
| float rnn_weight; |
| neuron *neu0; |
| int history[MAX_NGRAM_ORDER]; |
| uint32_t context[MAX_NGRAM_ORDER]; |
| int32 context_len; |
| int32 time; |
| int32 pre_bp; |
| int32 rnn_word_indx; |
| int32 pre_time; |
| int32 final_idx; /*index in the final node list*/ |
| char *word; |
| struct _rnnBT *pre_rnn; |
| struct _rnnBT *next; |

FIG. 1

| neuron |
| --- |
| real ac; //actual value stored in neuron |

FIG. 2

| synapse |
|---|
| real weight; //weight of synapse |

FIG. 3

| RnnLm |
|---|
| int class_size; |
| int **class_words; |
| int *class_cn; |
| int *class_max_cn; |
| int old_classes; |
| struct vocab_word *vocab; |
| int *vocab_hash; |
| int vocab_hash_size; |
| int vocab_size; |
| int vocab_max_size; |
| int layer0_size; |
| int layer1_size; |
| int layerc_size; |
| int layer2_size; |
| long long direct_size; |
| int direct_order; |
| int history[MAX_NGRAM_ORDER]; |
| uint32_t context[MAX_NGRAM_ORDER]; |
| int32 context_len; |
| int bptt; |
| ... |

FIG. 4A

| |
|---|
| • • • |
| int bptt_block; |
| int *bptt_history; |
| neuron *bptt_hidden; |
| struct synapse *bptt_syn0; |
| int gen; |
| int independent; |
| neuron *neu0; //neurons in input layer |
| neuron *neu1; //neurons in hidden layer |
| neuron *neuc; //neurons in hidden layer |
| neuron *neu2;//neurons in output layer |
| struct synapse *syn0;//weights between input and hidden layer |
| struct synapse *syn1;//weights between hidden and output layer (or hidden and compression if compression>0) |
| struct synapse *sync;//weights between hidden and compression layer |
| direct_t *syn_d;//direct parameters between input and output layer (similar to Maximum Entropy model parameters) |
| //backup used in n-bset rescoring:<br>neuron *neu1b2; |

FIG. 4B

| vocab_word |
| --- |
| int cn; |
| char word[MAX_STRING]; |
| real prob; |
| int class_index; |

FIG. 5

| rnn_Node_List |
|---|
| rnnBT *rnn_pt; |
| int32 *ef_idx;  // indexed by end frame |
| int32 rnn_com_idx; |

FIG. 6

| rnnBT |
|---|
| float ac_weight; |
| float rnn_weight; |
| neuron *neu0; |
| int history[MAX_NGRAM_ORDER]; |
| uint32_t context[MAX_NGRAM_ORDER]; |
| int32 context_len; |
| int32 time; |
| int32 pre_bp; |
| int32 rnn_word_indx; |
| int32 pre_time; |
| int32 final_idx; /*index in the final node list*/ |
| char *word; |
| rnnBT *pre_rnn; |
| rnnBT *next; |

FIG. 7

| FST_Node |
|---|
| int32 n_id; |
| float final_weight; |
| int32 arc_st; /*start arc id*/ |
| int32 num_arc; |

FIG. 8

| WFST |
|---|
| int32 num_state; |
| int32 org_num_state; /*origin num_state before inserting oov*/ |
| int64 num_arc; |
| FST_Node *head; |
| int32 *arc_end_node; |
| int32 *arc_i_label; |
| int32 *arc_o_label; |
| float *arc_weight; |
| int32 *arc_trans_id; |

```
Node_t *nodelist,
float *best_weight_list,
cont_node_t *words_start_frame_t,
int32 max_active_num,
int32 tot_frame,
float *adaptive_beam,
float beam,
float look_ahead_per_word,
rnnBT **best_elem
```

GetCutoff_rnn_look_ahead_new float

SYSTEM AND COMPUTER-EXECUTABLE PROGRAM CODE FOR ACCELERATED RESCORING WITH RECURRENT NEURAL NET LANGUAGE MODELS ON HYBRID CPU/GPU MACHINES USING A FRAME-WISE, DELAYED DISPATCH OF RNNLM SCORE COMPUTATION TASKS TO THE GPU(S)

FIELD OF THE INVENTION

The present invention relates generally to the field of automatic speech recognition (ASR), more specifically to ASR systems/methods that employ recurrent neural net language models (RNNLMs), and still more specifically to ASR systems that utilize RNNLM rescoring on hybrid CPU/GPU processors.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

"Language models are an essential component of automatic speech recognition (ASR) systems. In recent years, with the accessibility of greater computing power, recurrent neural network language models (RNNLM) [see T. Mikolov, et al., 'Rnnlm-recurrent neural network language modeling toolkit,' in Proc. of the 2011 ASRU Workshop, 2011, pp. 196-201] have become possible and have quickly surpassed back-off n-gram models [see JT Goodman, 'A bit of progress in language modeling,' Computer Speech & Language, vol. 15, no. 4, pp. 403-434, 2001] in various language-related tasks. However, because an RNNLM theoretically encodes infinite history lengths, it is virtually impossible to compile it to a static decoding graph; for this reason, RNNLMs are usually not directly used in decoding. The common method to take advantage of RNNLMs for ASR tasks is a 2-pass method: we decode on a pre-compiled decoding graph which is usually generated from a back-off n-gram language model as the first pass; instead of computing the 1-best hypothesis of the decoded results, we maintain a set of possible hypotheses and then in the second pass, use a more sophisticated neural-based model to rescore the hypotheses. N-best list rescoring and lattice-rescoring are among the most popular approaches." X. Hainan, et al., "A pruned rnnlm lattice-rescoring algorithm for automatic speech recognition," in Proc. ICASSP, IEEE, 2017.

However, even using 2-pass lattice rescoring, RNNLM-based ASR is still extremely computationally expensive. While the improved accuracy that RNNLM decoding enables is highly desirable for commercial, large vocabulary continuous speech recognition (LVCSR) applications, there exists a serious need for speed improvement in the evaluation of such models.

Attempts to improve the speed of RNNLM-based systems have typically focused on the use of hybrid CPU/GPU systems. [As used herein, a hybrid CPU/GPU system is a system that contains at least one CPU (with any number of cores) and at least one GPU (again, with any number of execution units). Examples of such systems include servers that contain one multi-core Intel CPU and one Nvidia GPU.] To date, most of the research effort has focused on building or training RNNLMs using GPU-accelerated systems. See, e.g., X. Chen, et al., "CUED-RNNLM—An open-source toolkit for efficient training and evaluation of recurrent neural network language models." 2016 IEEE international conference on acoustics, speech and signal processing (ICASSP), IEEE, 2016; G. Neubig, et al., "Dynet: The dynamic neural network toolkit," arXiv preprint arXiv: 1701.03980 (2017); and X. Zhang, et al., "Multi-GPU Based Recurrent Neural Network Language Model Training," International Conference of Young Computer Scientists, Engineers and Educators, Springer, Singapore, 2016.

However, attempts by persons skilled in the art to implement multi-pass ASR decoders with RNNLM rescoring that operate at many times real-time, using large-scale models on reasonable hardware have been lacking. The present invention, as described below, addresses at least this need.

SUMMARY OF THE INVENTION

Implementation of RNNLM rescoring on hybrid CPU/GPU systems is challenging for several reasons: The scoring of RNNLMs is very computationally intensive, and thus potentially well suited to a GPU; however, such models are also too large to store in GPU RAM, and thus relevant portions must be swapped onto the GPU RAM as needed. Such model swapping onto the GPU RAM can substantially undermine the efficiency of the overall system. The inventor herein has discovered that a particularly efficient way to resolve this tradeoff is to utilize delayed, frame-wise (or layer-wise) batch dispatch of RNN scoring tasks to the GPU(s), while performing substantially all other tasks on the CPU(s), as exemplified in the source code that follows (under the heading Detailed Description of the Preferred Embodiment).

Accordingly, generally speaking, and without intending to be limiting, one aspect of the invention relates to a system (and/or executable program code) for rescoring a weighted finite-state transducer (WFST) lattice, using a recurrent neural net language model (RNNLM), such system implemented on a hybrid computing platform that includes a central processing unit (CPU) and a graphics processing unit (GPU), such system further comprising, for example, at least the following: means for storing a RNNLM; and means [see function rnn_rescoring_gpu( ) in the provided source code, for "corresponding structure" under § 112(f)] for performing a RNNLM rescoring of a WFST lattice, said means for performing a RNNLM rescoring comprising, for example: means for obtaining a maximum order for the RNNLM; means for specifying a RNNLM search beam; means for allocating a hash table; means for adding a first RNNLM node, corresponding to a first frame, onto an RNNLM nodelist; means for performing n-gram rescoring on the CPU; means for adding additional RNNLM nodes onto the RNNLM nodelist; first means for dispatching the RNNLM nodelist for batch score computation on the GPU; means for processing additional frame(s), said means including, for example: means for obtaining a cutoff look-ahead value, based on said RNNLM search beam and other parameters; means for adding RNNLM nodes to an additional RNNLM nodelist based on words in the WFST that end in a next frame of interest; and second means for dispatching the additional RNNLM nodelist for batch score computation on the GPU.

In some embodiments, the means for storing a RNNLM includes a linked list of RNNLM nodes.

In some embodiments, the means for performing a RNNLM rescoring further includes means for excluding filler words from the RNNLM rescoring process.

In some embodiments, the means for performing a RNNLM rescoring further includes means for deallocating the list of RNNLM nodes after they are processed by the GPU batch score computation process.

In some embodiments, the means for performing a RNNLM rescoring further includes means for copying an input layer of a RNNLM to a RNNLM nodelist.

In some embodiments, the means for performing a RNNLM rescoring further includes means for copying a hidden layer of a RNNLM to a RNNLM nodelist.

In some embodiments, such system further includes means for selecting a best path through the WFST lattice using RNNLM scores.

In some embodiments, the means for selecting a best path through the WFST lattice using RNNLM scores includes means for hashing computed partial paths through portions of the WFST lattice.

In some embodiments, such system further includes means for storing vocabulary words associated with the RNNLM.

In some embodiments, the means for storing vocabulary words associated with the RNNLM separates the vocabulary words into multiple classes.

In some embodiments, the means for dispatching the RNNLM nodelist for batch score computation on the GPU receives a linked list of RNNLM nodes, where each node contains index, current word, history, hidden layer, etc., and the computed RNNLM score(s) are returned through this linked list structure.

In some embodiments, the means for dispatching the RNNLM nodelist for batch score computation on the GPU receives one or more scaling constants.

In some embodiments, the means for dispatching the RNNLM nodelist for batch score computation on the GPU receives a score to associate with word(s) that are out of the RNNLM vocabulary.

In some embodiments, the means for dispatching the RNNLM nodelist for batch score computation on the GPU receives an index to the nodes in the RNNLM nodelist.

In some embodiments, the means for dispatching the RNNLM nodelist for batch score computation on the GPU receives an indication of the RNNLM hidden layer size.

In some embodiments, the means for dispatching the RNNLM nodelist for batch score computation on the GPU receives a value indicative of a number of vocabulary classes.

In some embodiments, the means for dispatching the RNNLM nodelist for batch score computation on the GPU receives lists of words for each vocabulary class.

In some embodiments, such system further includes means for loading relevant portion(s) of a RNNLM into CPU RAM.

In some embodiments, such system further includes means for clearing irrelevant portion(s) of a RNNLM from CPU RAM.

In some embodiments, such system further includes means for transferring relevant portion(s) of a RNNLM from CPU RAM to GPU RAM.

Additional aspects, features, and advantages of the invention can be gleaned from the incorporated source code, as any skilled programmer can appreciate.

As persons skilled in the art will appreciate, these figures are mere graphical respresenations of selected structures (both data and executable program code) described in applicant's source code, below. It will be further appreciated that any aspect or feature of applicant's source code can be similarly depicted in graphical form, by a simple transformation that any skilled artisan could readily undertake.

DETAILED DESCRIPTION OF THE PREFERRED EMBODIMENT

Figure 1:
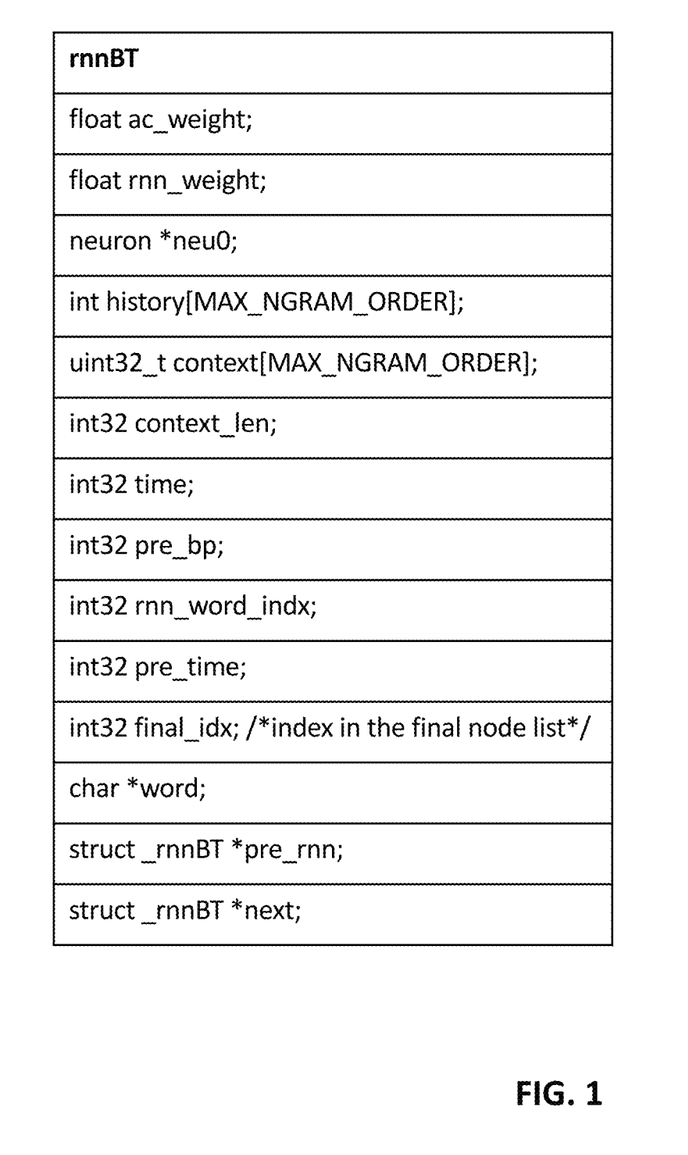
FIG. 1 depicts a structured data record of type "rnnBT.
Figure 2:
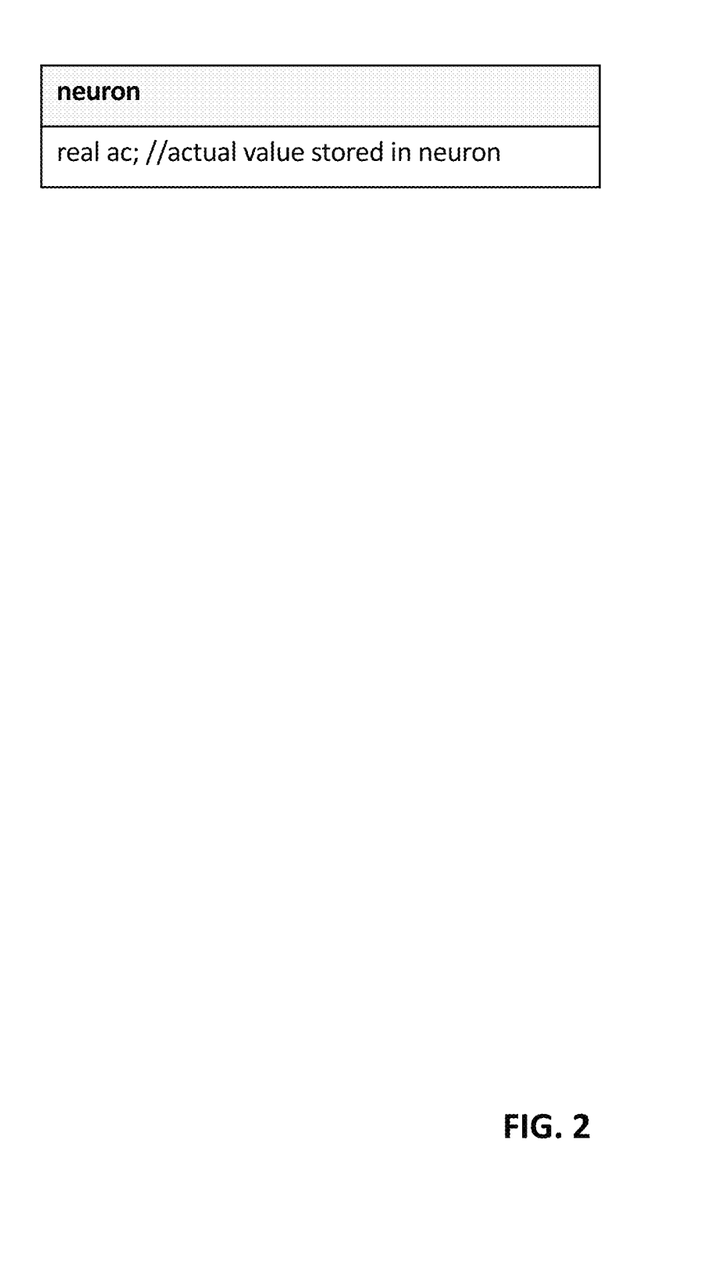
"
FIG. 2 depicts a structured data record of type "neuron.
Figure 3:
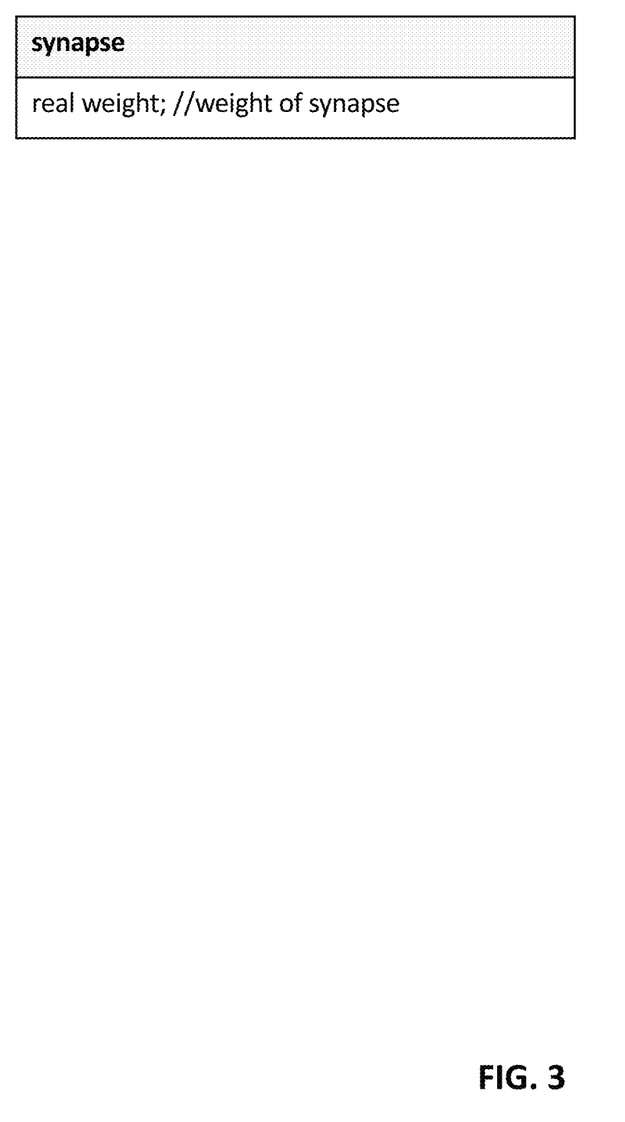
"
FIG. 3 depicts a structured data record of type "synapse.
Figure 4A:
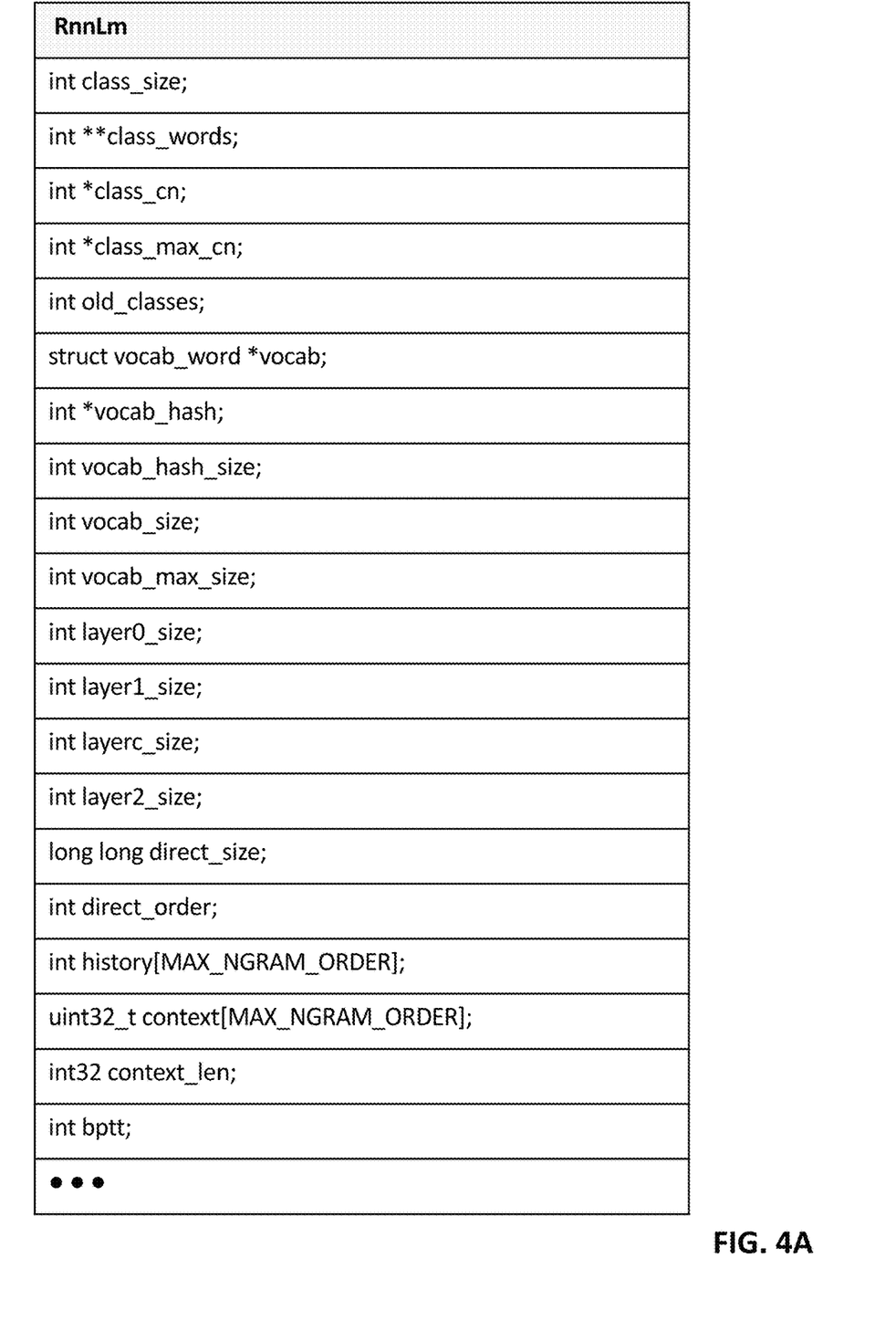
"
FIG. 4A-B depict a structured data record of type "RnnLm.
Figure 4B:
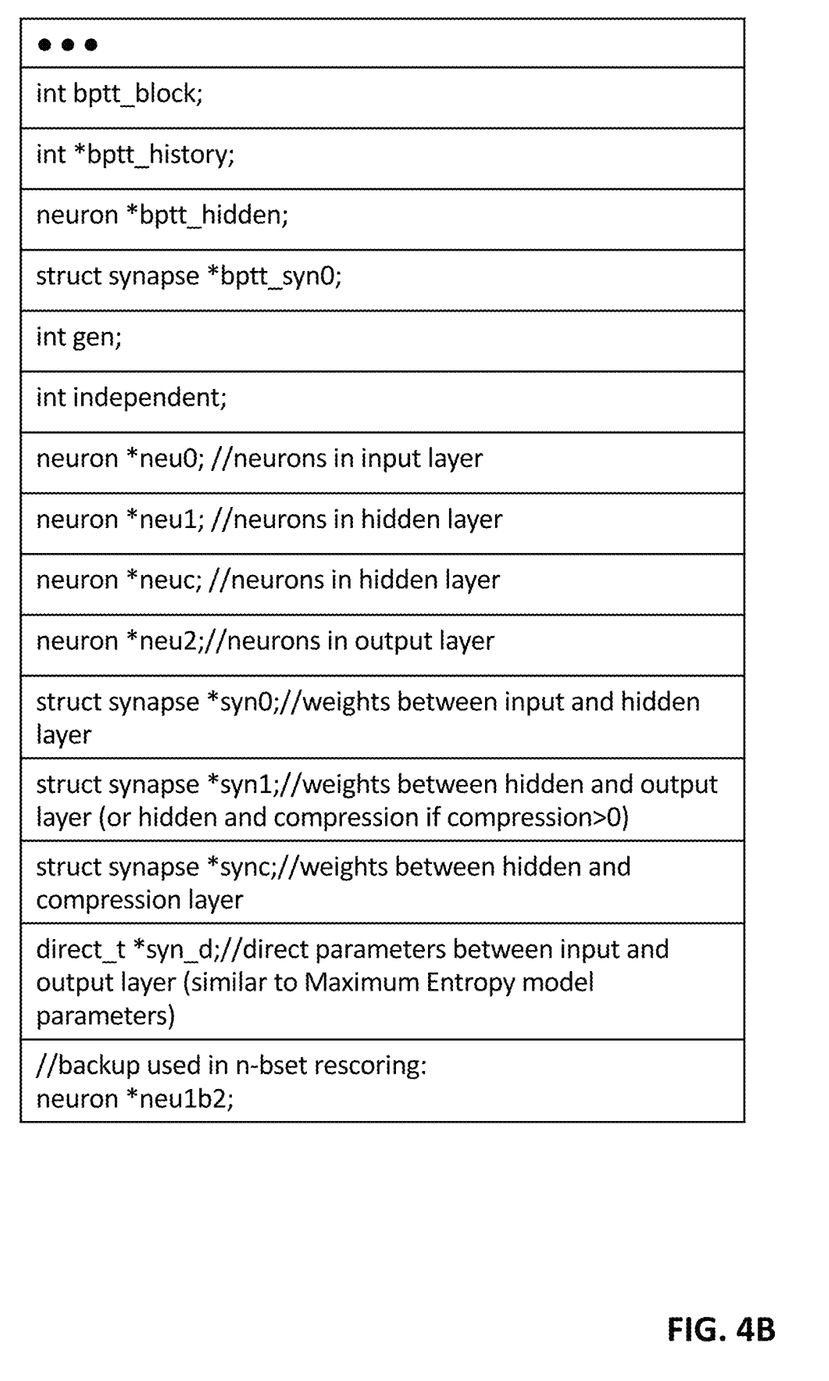
Figure 5:
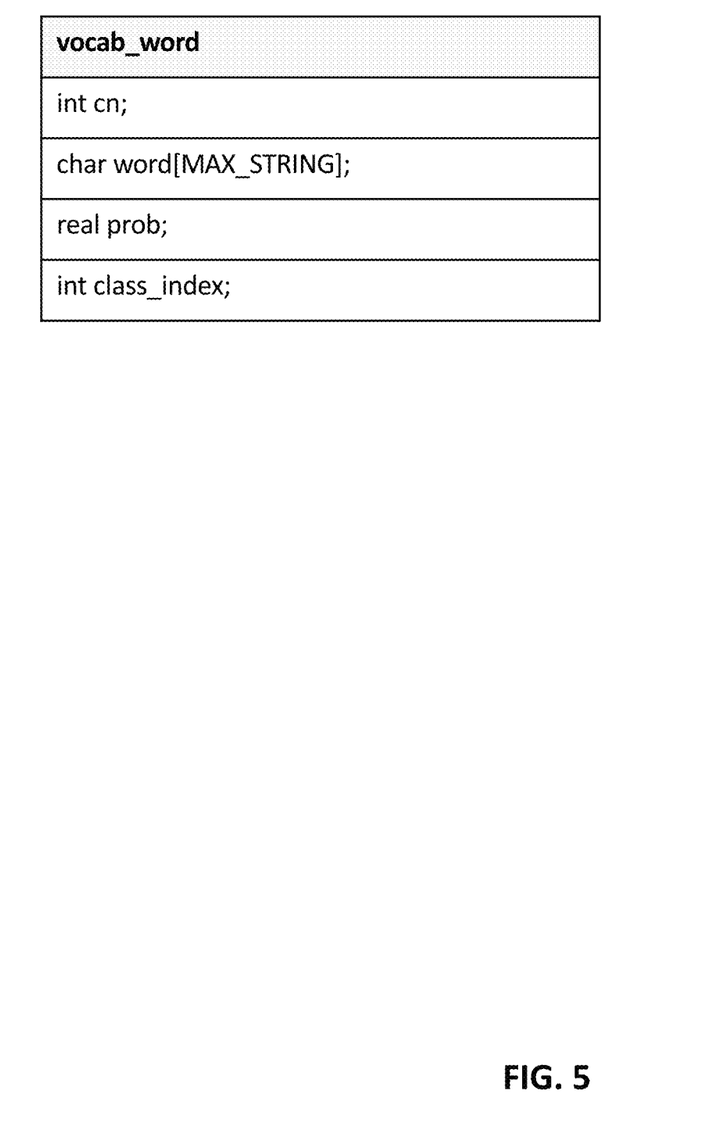
"
FIG. 5 depicts a structured data record of type "vocab_word.
Figure 6:
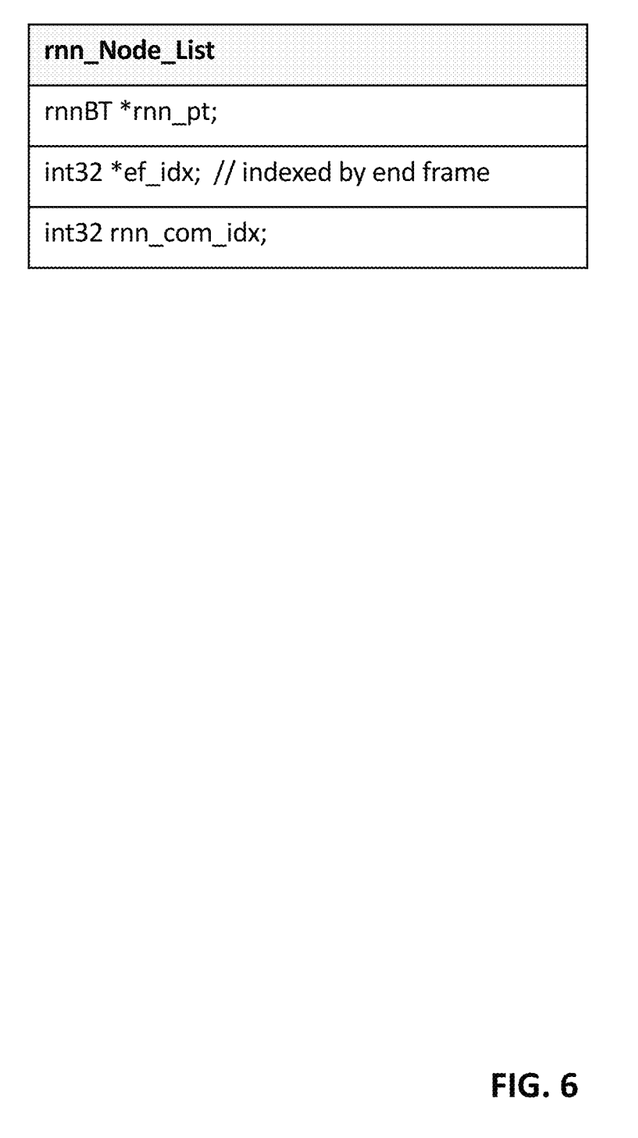
"
FIG. 6 depicts a structured data record of type "rnn_Node_List.
Figure 7:
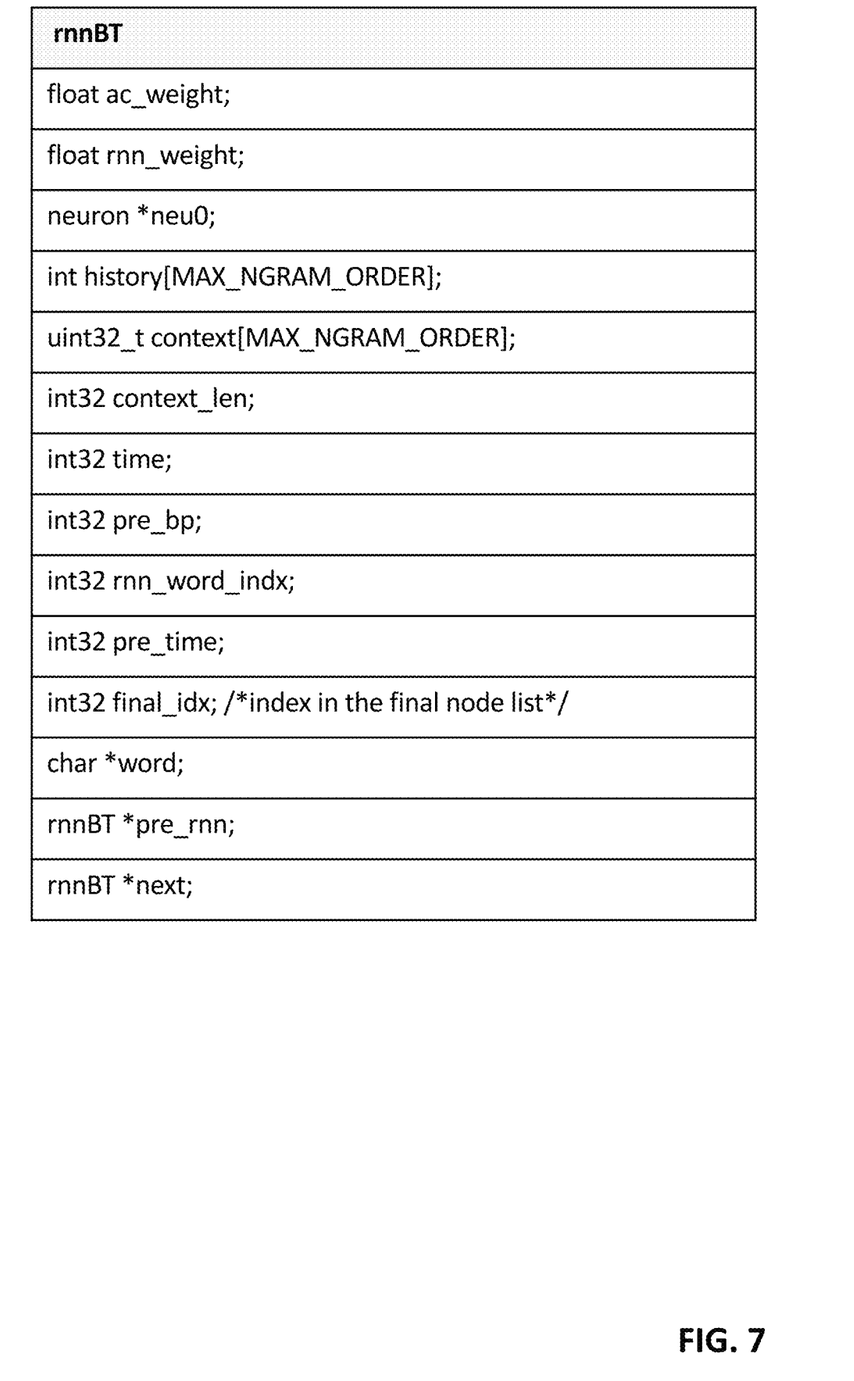
"
FIG. 7 depicts a structured data record of type "rnnBT.
Figure 8:
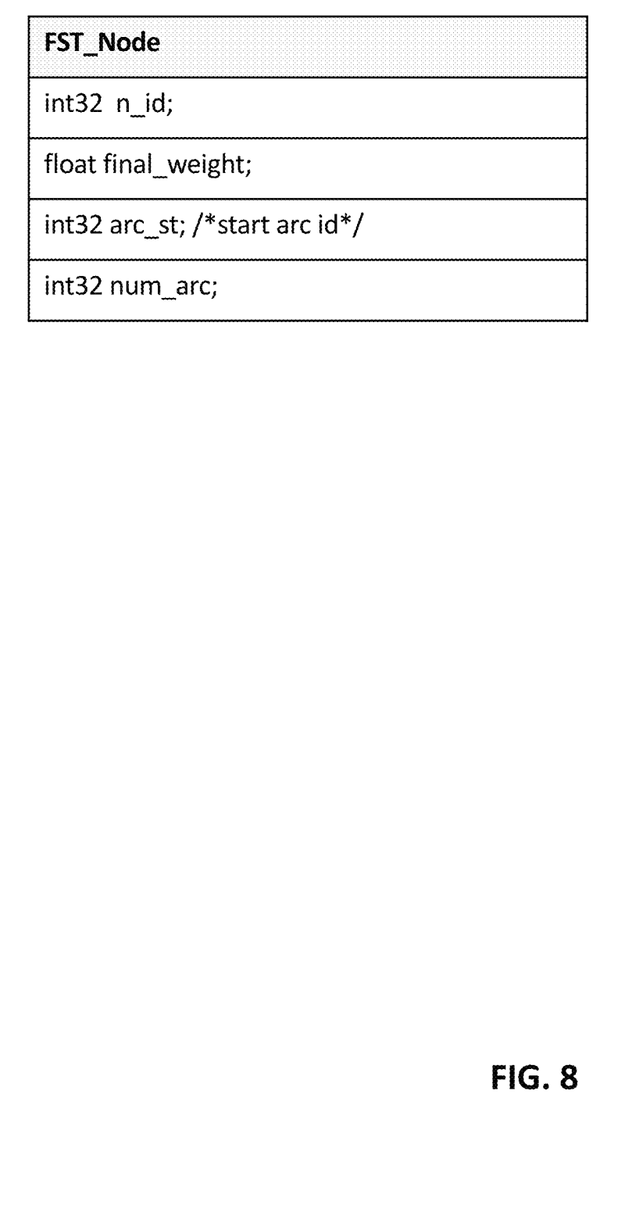
"
FIG. 8 depicts a structured data record of type "FST_Node.
Figure 9:
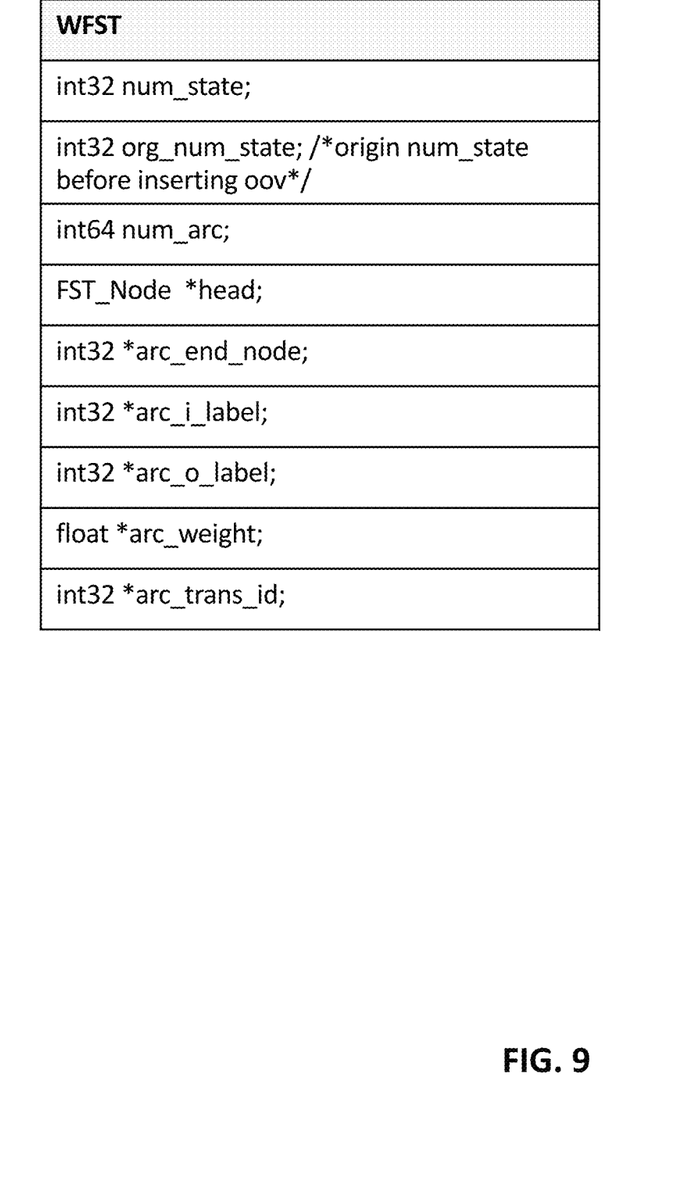
"
FIG. 9 depicts a structured data record of type "WFST.
Figure 10:
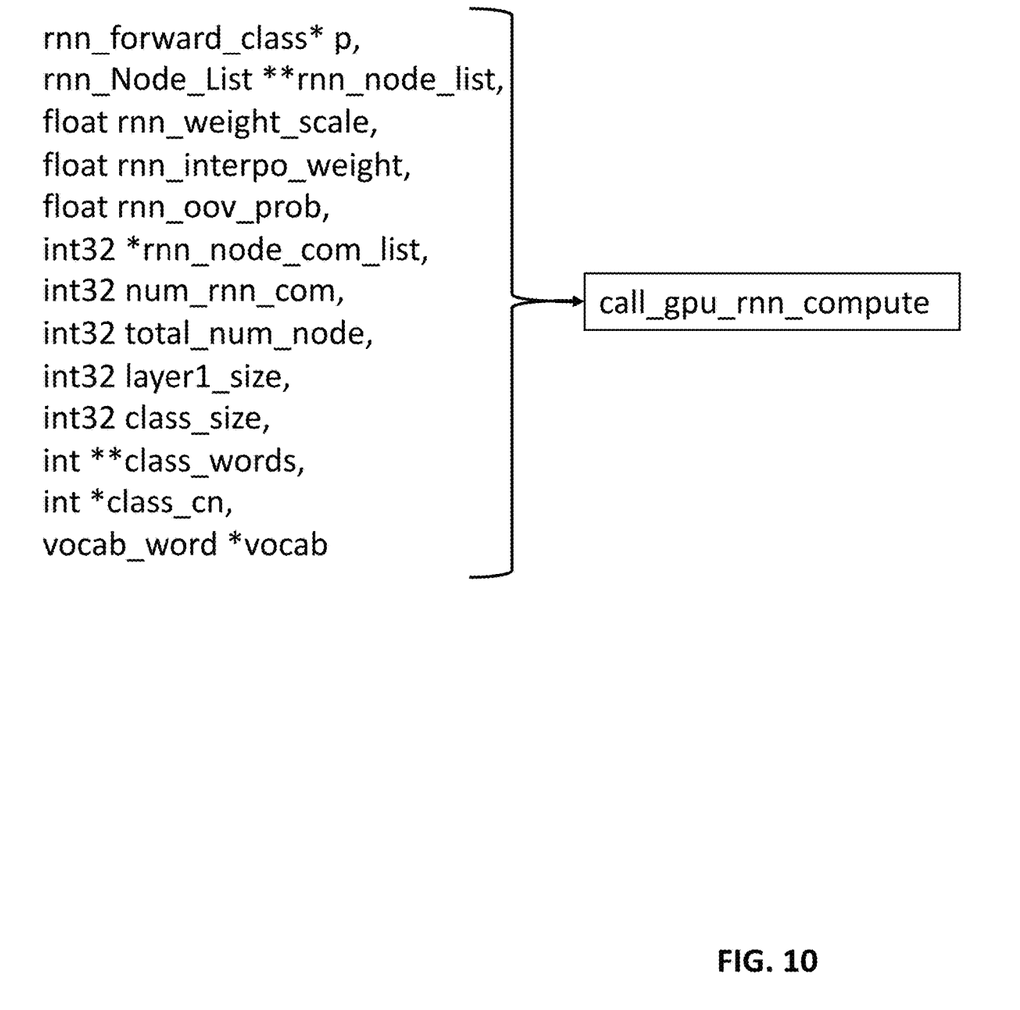
"
FIG. 10 depicts the interface structure of the function "call_gpu_rnn_compute( ).
Figure 11:
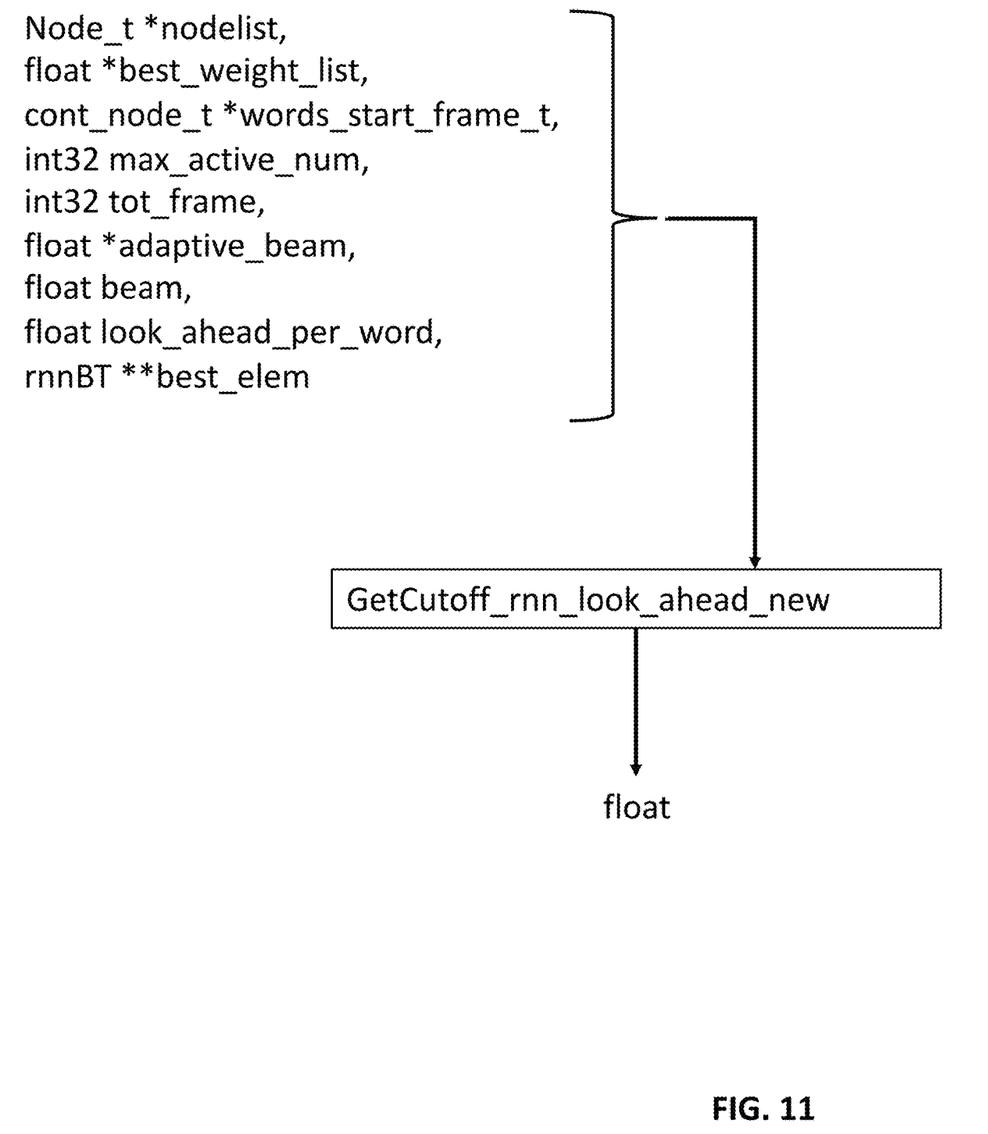
"
FIG. 11 depicts the interface structure of the function "GetCutoffrnn_look_ahead_new( )."

Referring now to FIG. 10, which depicts an exemplary embodiment of an executable code module (call_gpu_rnn_compute) for batch rnnlm score computation on a GPU. As depicted, the functional parameters associated with this embodiment include:

rnn_Node_List **rnn_node_list, /* a linked list of rnnlm nodes, where each node contains index, current word, history, and hidden layer, etc.; the computed rnnlm score(s) will be returned through this structure*/ float rnn_weight_scale, /* the computed rnnlm score will be scaled with this value*/ float rnn_interpo_weight, /* if we do rnnlm rescore plus ngram rescore, the computed rnnlm score will be once more scaled with this value*/ float rnn_oov_prob, /*if a word is out of rnnlm vocabulary, we specify this value as its rnnlm score */ int32 *rnn_node_com_list, /*index list of the rnnlm nodes in rnn_node_list */ int32 num_rnn_com, /*number of rnnlm nodes in rnn_node_list*/ int32 total_num_node, /*not used at this time*/ int32 layerl_size, /*rnnlm hidden layer size*/ int32 class_size, /* this number specify how many classes that the vocabulary will be grouped into*/ int **class_words, /* pointers to words classes, each class includes multiple words*/ int *class_cn, /* list of number of words in the class*/ vocab_word *vocab /* vocabulary information*/

Persons skilled in the art will appreciate that other aspects of applicant's preferred embodiment can be understood by referring to the source code, which appears on pages 7-166 of applicant's originally filed specification, Ser. No. 16/237,014, Conf. No. 9264, filed Dec. 31, 2018, which pages are incorporated herein by reference.

What is claimed in this application is:

1. A system for rescoring a weighted finite-state transducer (WFST) lattice, using a recurrent neural network language model (RNNLM), said system implemented on a hybrid computing platform that includes a central processing unit (CPU) and a graphics processing unit (GPU), said system further comprising at least the following:

computer executable code for storing a RNNLM; and, a module for performing a RNNLM rescoring of a WFST lattice, said module for performing a RNNLM rescoring comprising:

computer executable code for obtaining a maximum order for the RNNLM;

computer executable code for specifying a RNNLM search beam;

computer executable code for allocating a hash table;

computer executable code for adding a first RNNLM node, corresponding to a first frame, onto an RNNLM nodelist;

computer executable code for performing n-gram rescoring on the CPU;

computer executable code for adding additional RNNLM nodes onto the RNNLM nodelist;

first computer executable code for dispatching the RNNLM nodelist for batch score computation on the GPU;

a module for processing additional frame(s), said module including:

computer executable code for obtaining a cutoff look-ahead value, based on said RNNLM search beam and other parameters;

computer executable code for adding RNNLM nodes to an additional RNNLM nodelist based on words in the WFST that end in a next frame of interest; and,   second computer executable code for dispatching the additional RNNLM nodelist for batch score computation on the GPU.

2. A system for rescoring the WFST lattice, using the RNNLM, as defined in claim 1, wherein the computer executable code for storing the RNNLM includes a linked list of RNNLM nodes.

3. A system for rescoring the WFST lattice, using the RNNLM, as defined in claim 1, wherein the module for performing the RNNLM rescoring further includes computer executable code for excluding filler words from the RNNLM rescoring process.

4. A system for rescoring the WFST lattice, using the RNNLM, as defined in claim 1, wherein the module for performing the RNNLM rescoring further includes computer executable code for deallocating the list of RNNLM nodes after they are processed by the GPU batch score computation process.

5. A system for rescoring the WFST lattice, using the RNNLM, as defined in claim 1, wherein the module for performing the RNNLM rescoring further includes computer executable code for copying an input layer of the RNNLM to the RNNLM nodelist.

6. A system for rescoring the WFST lattice, using the RNNLM, as defined in claim 5, wherein the module for performing the RNNLM rescoring further includes computer executable code for copying a hidden layer of the RNNLM to the RNNLM nodelist.

7. A system for rescoring the WFST lattice, using the RNNLM, as defined in claim 1, further including computer executable code for selecting a best path through the WFST lattice using RNNLM scores.

8. A system for rescoring the WFST lattice, using the RNNLM, as defined in claim 7, wherein the computer executable code for selecting a best path through the WFST lattice using RNNLM scores includes computer executable code for hashing computed partial paths through portions of the WFST lattice.

9. A system for rescoring the WFST lattice, using the RNNLM, as defined in claim 1, further including computer executable code for storing vocabulary words associated with the RNNLM.

10. A system for rescoring the WFST lattice, using the RNNLM, as defined in claim 9, wherein the computer executable code for storing vocabulary words associated with the RNNLM separates the vocabulary words into multiple classes.

11. A system for rescoring the WFST lattice, using the RNNLM, as defined in claim 1, wherein the computer executable code for dispatching the RNNLM nodelist for batch score computation on the GPU receives a linked list of RNNLM nodes, where each node contains index, current word, history, hidden layer, etc., and the computed RNNLM score(s) are returned through this linked list structure.

12. A system for rescoring the WFST lattice, using the RNNLM, as defined in claim 11, wherein the computer executable code for dispatching the RNNLM nodelist for batch score computation on the GPU receives one or more scaling constants.

13. A system for rescoring the WFST lattice, using the RNNLM, as defined in claim 11, wherein the computer executable code for dispatching the RNNLM nodelist for batch score computation on the GPU receives a score to associate with word(s) that are out of the RNNLM vocabulary.

14. A system for rescoring the WFST lattice, using the RNNLM, as defined in claim 11, wherein the computer executable code for dispatching the RNNLM nodelist for batch score computation on the GPU receives an index to the nodes in the RNNLM nodelist.

15. A system for rescoring the WFST lattice, using the RNNLM, as defined in claim 11, wherein the computer executable code for dispatching the RNNLM nodelist for batch score computation on the GPU receives an indication of the RNNLM hidden layer size.

16. A system for rescoring the WFST lattice, using the RNNLM, as defined in claim 11, wherein the computer executable code for dispatching the RNNLM nodelist for batch score computation on the GPU receives a value indicative of a number of vocabulary classes.

17. A system for rescoring the WFST lattice, using the RNNLM, as defined in claim 16, wherein the computer executable code for dispatching the RNNLM nodelist for batch score computation on the GPU receives lists of words for each vocabulary class.

18. A system for rescoring the WFST lattice, using the RNNLM, as defined in claim 1, further including computer executable code for loading relevant portion(s) of the RNNLM into CPU RAM.

19. A system for rescoring the WFST lattice, using the RNNLM, as defined in claim 1, further including computer executable code for clearing irrelevant portion(s) of the RNNLM from CPU RAM.

20. A system for rescoring the WFST lattice, using the RNNLM, as defined in claim 1, further including computer executable code for transferring relevant portion(s) of the RNNLM from CPU RAM to GPU RAM.

* * * * *